Jan. 2, 1934.　　　　G. MANIKOWSKE　　　　1,941,611
WIND DRIVEN ELECTRIC POWER GENERATOR WITH PUMPING ATTACHMENT
Original Filed Nov. 30, 1927　　　3 Sheets-Sheet 1
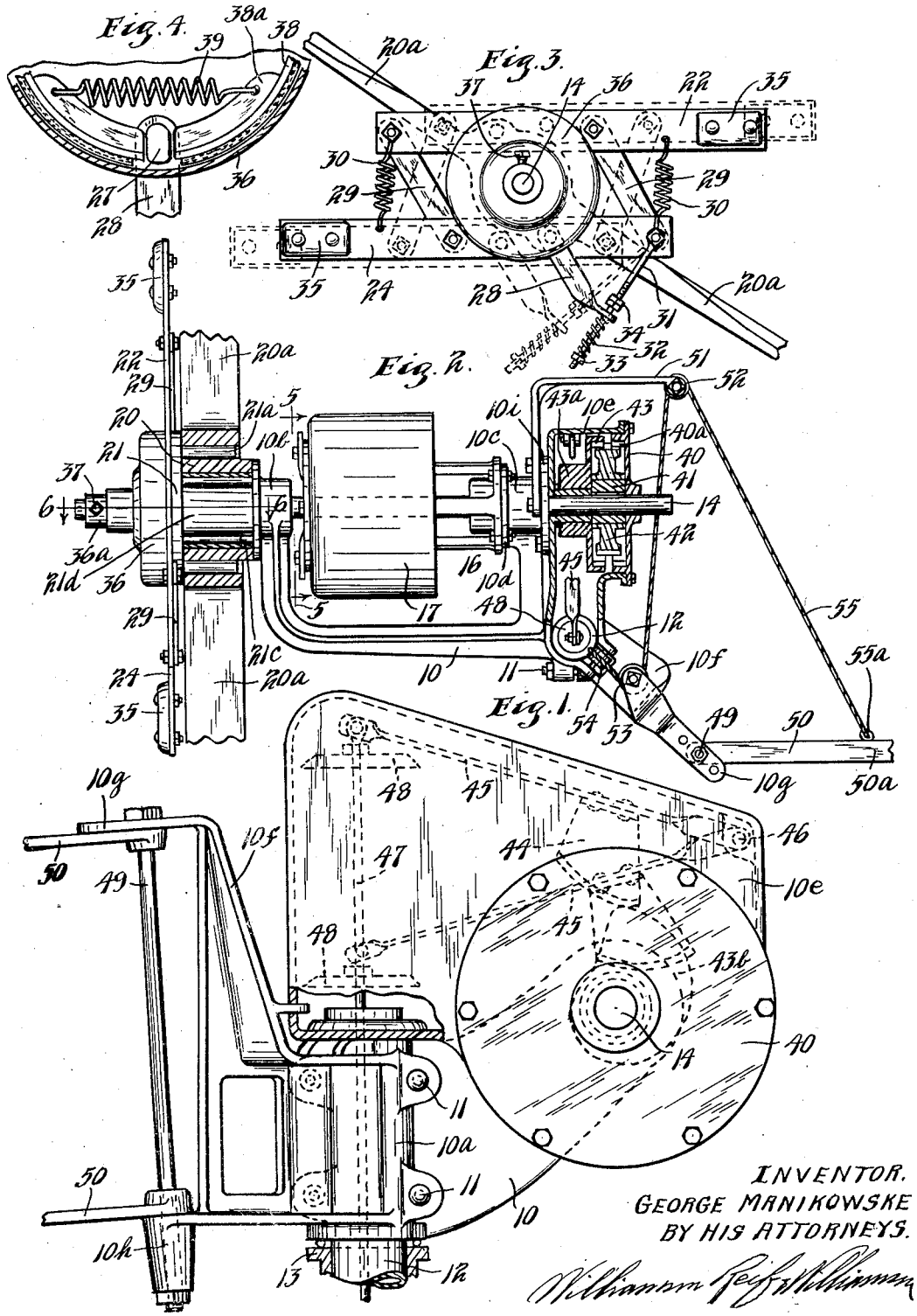
INVENTOR.
GEORGE MANIKOWSKE
BY HIS ATTORNEYS.

Jan. 2, 1934.   G. MANIKOWSKE   1,941,611
WIND DRIVEN ELECTRIC POWER GENERATOR WITH PUMPING ATTACHMENT
Original Filed Nov. 30, 1927   3 Sheets-Sheet 2
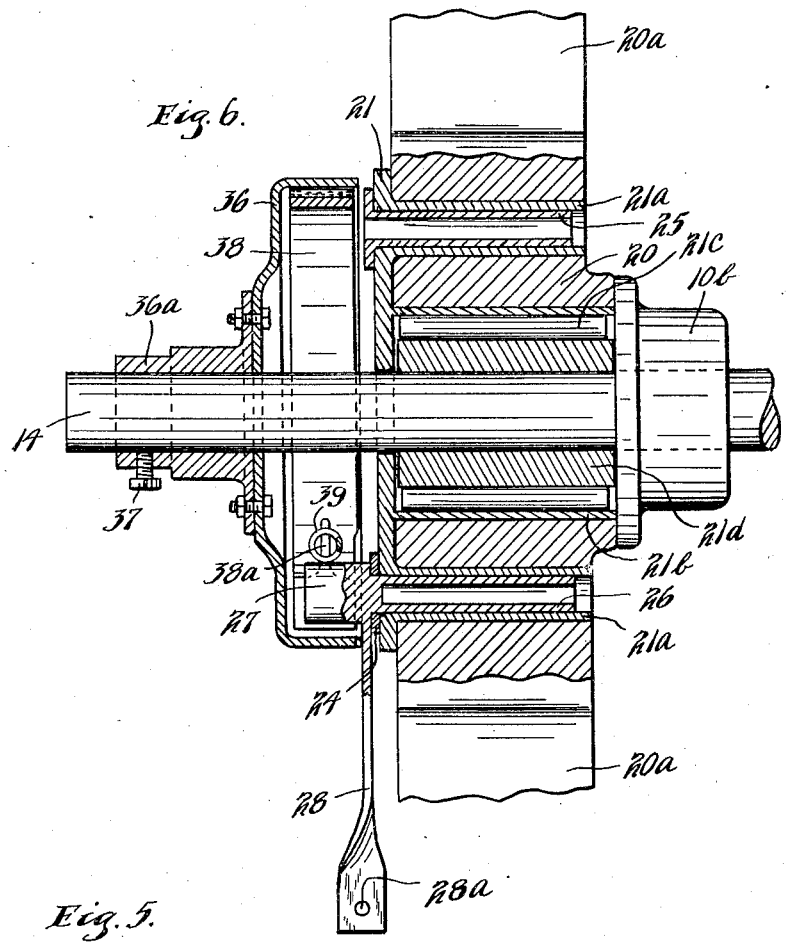
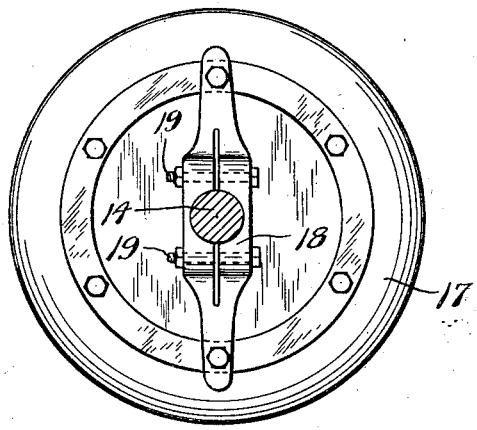
INVENTOR.
GEORGE MANIKOWSKE.
BY HIS ATTORNEYS.

Jan. 2, 1934. G. MANIKOWSKE 1,941,611
WIND DRIVEN ELECTRIC POWER GENERATOR WITH PUMPING ATTACHMENT
Original Filed Nov. 30, 1927   3 Sheets-Sheet 3
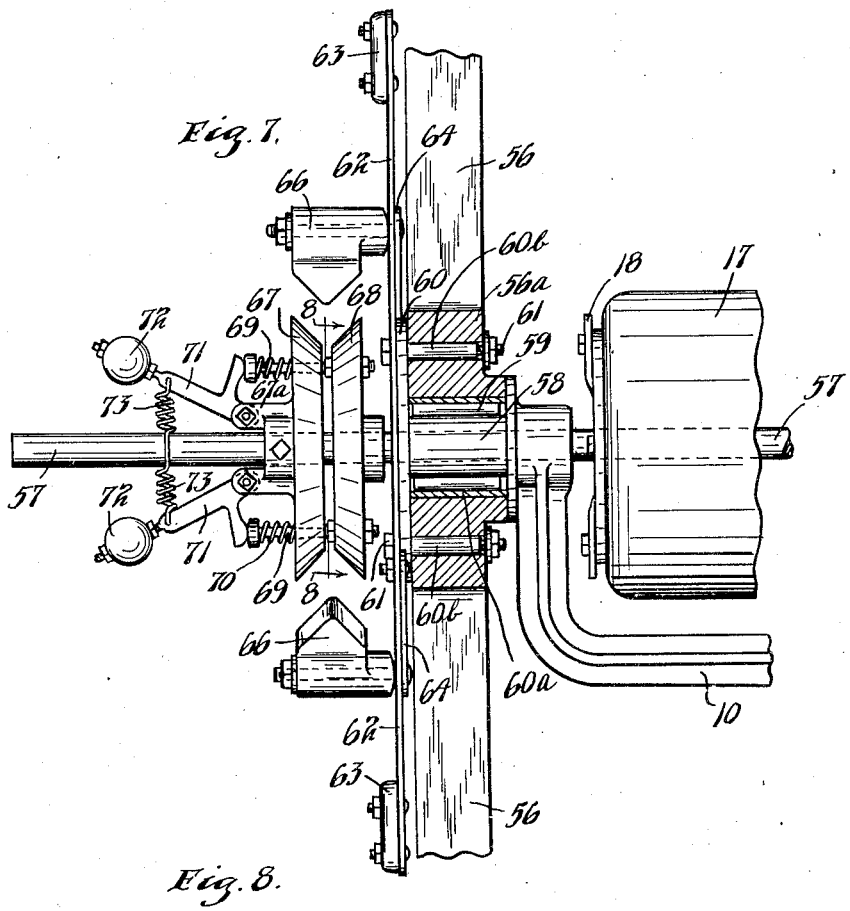
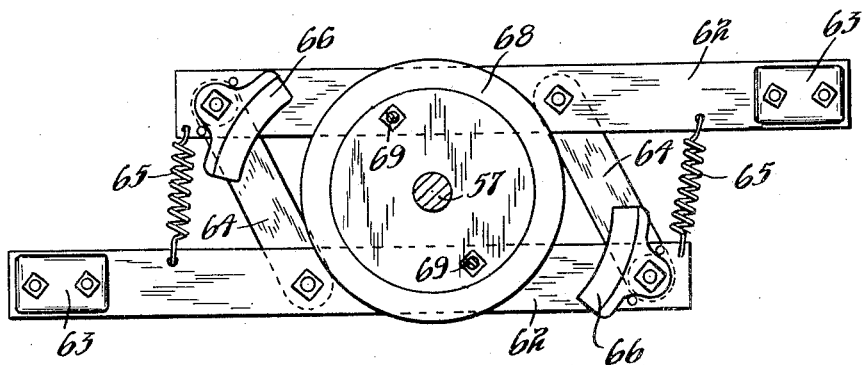
INVENTOR.
GEORGE MANIKOWSKE
BY HIS ATTORNEYS.

Patented Jan. 2, 1934

1,941,611

UNITED STATES PATENT OFFICE 1,941,611

WIND DRIVEN ELECTRIC POWER GENERATOR WITH PUMPING ATTACHMENT

George Manikowske, Minneapolis, Minn., assignor, by mesne assignments, to Ethel Purdon Manikowske, Minneapolis, Minn.

Application November 30, 1927, Serial No. 236,680. Renewed February 21, 1931

14 Claims. (Cl. 290—55)

This invention relates to a device for generating power from the energy of the wind and comprises both an electrical mechanism and mechanical mechanism, both of which are operated from the wind driven device. The invention particularly relates to a mechanism for controlling the operation of wind driven devices or propellers, the electrical mechanism and the mechanical mechanism. As is well known, a wind driven propeller has small starting torque and it is desirable to have a mechanism for connecting the propeller to the parts to be operated, after said propeller has attained a certain speed and momentum. It is also desirable to have a mechanism for disconnecting said propeller from the driven mechanism after the same has attained a certain speed.

It is an object of this invention, therefore, to provide a wind driven means or propeller and means for connecting the same to the parts to be driven thereby, after said propeller has attained a certain speed.

It is another object of the invention to provide a wind driven propeller and means for disconnecting the same from the parts driven thereby after the propeller has attained a certain speed.

It is a further object of the invention to provide a novel mounting for a propeller and electrical parts driven thereby.

It is still another object of the invention to provide a simple and efficient pump driving mechanism actuated from the wind driven elements, and one that can be removed and replaced in assembled condition with a minimum of trouble.

These and other objects and advantages of the invention will be fully set forth in the following description made in connection with the accompanying drawings, in which like reference characters refer to similar parts throughout the several views and in which:—

Fig. 1 is a view in side elevation showing the invention, certain parts being broken away and other parts being shown in vertical section;

Fig. 2 is a top plan view of the invention, certain parts being broken away and others shown in horizontal section;

Fig. 3 is a view in side elevation of the controlling mechanism used, as seen from the left of Fig. 1;

Fig. 4 is a partial vertical section on an enlarged scale of said controlling mechanism;

Fig. 5 is a vertical section taken on line 5—5 of Fig. 2;

Fig. 6 is a vertical section taken on line 6—6 of Fig. 2;

Fig. 7 is a partial view similar to Fig. 2, showing a modification; and

Fig. 8 is a section taken on line 8—8 of Fig. 7.

Referring to the drawings, particularly Figs. 1 to 6, a wind driven power generating structure is shown, comprising a yoke frame 10, said frame having a hub portion 10a which comprises a separable cap, said parts being bolted together by the headed and nutted bolts 11 and adapted to clamp a revoluble support 12 shown as in the form of a pipe, the said hub being supported upon a column 13 preferably by ball bearings. Yoke frame 10 has spaced bearings 10b and 10c carrying ball bearings therein, in which is supported a shaft 14. The bearing 10c also comprises flange 10d to which is connected the stator frame 16 of an electrical generator, the rotor of which is shown at 17. This generator may be similar to that disclosed and claimed in an earlier application filed October 21, 1925, S. N. 64,062. The member 17 is secured to the shaft 14 by a pair of clamping arms 18 connected by the headed and nutted bolts 19 as shown in Fig. 5. It will be seen that bolts 19 can be loosened and member 17 thus allowed to run free on the shaft. A propeller 20 is provided, comprising blades 20a which will have a flat and somewhat helical portion at their outer ends, as is customary, only the inner portions of these blades being shown. Said propeller has a hub having circumferentially spaced holes therein, in which are disposed the sleeves 21a, which are integral with a cylindrical flange 21 which has a cylindrical hub 21b extending through the propeller. The hub 21b turns on roller bearings 21c engaging bushing 21d on shaft 14. Immediately adjacent the flange 21 is a pair of bars 22 and 24 disposed at either side of the shaft 14. The bar 22 has integrally secured thereto, as by welding, a tubular pin 25 which extends through one of the sleeves 21a. Another similar pin 26 extends through the other sleeve 21a and is integrally secured to a cam 27 and to an arm 28. The sleeve 26 passes through the bar 24. Said bars 22 and 24 are pivotally connected by a pair of links 29. Bars 22 and 24 are also connected by a pair of tension springs 30, one end of each of which is connected to one of the bolts securing the links 29 and the other end of which is secured in a hole in the bars 22 and 24 respectively. A rod 31 is provided, having an eyelet at one end received on one of the bolts holding one of the springs 30, said rod extending at an angle and through an opening in the arm 28, said arm having its end twisted 90° to receive said rod. A spring 32 surrounds rod 31 beyond arm 28, engaging said arm at one end and a nut 33 at its other end, said nut being threaded on rod 31. A pair of nuts 34 are also threaded on the rod 31 at the side of arm 28 opposite spring 32. Weights 35 are secured to the outer ends of arms 22 and 24, and a drum 36 is provided, having a central projection with a hub portion 36a fitting about shaft 14 to which it is secured by the set screw 37. A brake member 38 in the form of a circular band of resilient flat material, is disposed within the drum 36, being split at one point and having a cam 27 disposed between its ends, said cam as shown in Fig. 4 being of greater length than width. The member 38 has flanges 38a adjacent its free ends which are apertured to receive the ends of a tension spring 39.

The member 10 includes a casing 10e having a flange at its outer end to which is bolted the cover plate 40 having a bearing receiving the outer end of shaft 14. The cover 40 has an internal gear 40a formed thereon, and while this gear may have various numbers of teeth, in one embodiment of the invention the same is provided with forty-nine teeth. A member 41 is secured to the shaft 14 by being keyed thereto, said member being cylindrical at its outer side, the center of said cylindrical surface being eccentric to the center of the shaft 14. A gear 42 is journaled on the member 41, said gear meshing with gear 40a and with an internal gear 43, and while said latter gear may have various numbers of teeth, in one embodiment of the invention the same is provided with forty-six teeth, gear 42 in the same embodiment being provided with forty teeth. The gear 43 has a hub 43a journaled on a cylindrical projection of casing 10e through which shaft 14 passes. The hub 43a has a cam 43b secured thereto, as shown in Figs. 1 and 2, which cam is adapted to co-operate with a cam 44 secured to an arm 45 pivoted at one end of the casing on a pivot 46 received between lugs on said casing. The arm 45 is pivotally connected at its other end to a vertical reciprocating rod 47 which may be secured to a pump. Rod 47 has a cover 48 secured thereto and movable therewith. The member 10 has a portion 10f integral therewith and projecting therefrom, having spaced apertured arms 10g and 10h through which pass a headed and nutted bolt 49. The spaced arms 50 of a vane 50a are apertured to receive the bolt 49 whereby said vane is carried by said bolt. An arm 51 is secured to the flange 10i on member 10 adjacent the casing 10e, which arm is of right-angled shape as shown in Fig. 2 and has journaled at its outer end a sheave 52. Another sheave 53 is journaled in the projection 10f of the member 10 and a third sheave 54 is journaled in member 10 at the portion 10a thereof, the latter sheave rotating on an axis at right angles to the axis of sheave 53. A rope or other flexible member 55 is secured to vane 50a by means of an eye bolt 55a and extends therefrom over sheaves 52, 53 and 54, said rope passing downward from sheave 54 to a position where it can be conveniently manipulated by the operator to swing the vane 50a when desired.

In operation the rotor 17 will usually be secured to the shaft 14 and when the propeller is swung against the wind by the rotation of frame 10, the propeller will be driven. After the propeller attains a certain speed, the weights 35 will be thrown outwardly and bars 22 and 24 will move outwardly toward the position shown in dotted lines in Fig. 3. This movement swings arm 28 and cam 27 is turned about its pivot and engages the ends of ribs 38a on the brake band 38 to force said band into engagement with drum 36. The drum 36 being connected to shaft 14, the propeller will thus be connected to said shaft. Arms 22, 24, the propeller and all parts connected thereto thus revolve together. Shaft 14 will thus be driven with the rotor 17 and the generator will be operated and current will thus be generated and can be taken off and used as desired. At the same time the eccentric 41 will be rotated and gear 42 will be eccentrically moved or gyrated within gears 43 and 40a. Gear 42 as stated, meshes with both gears 43 and 40a, the latter gear being stationary and having a greater number of teeth than gear 43, the latter will be driven at much reduced speed from that of shaft 14. The gear 43 operates the cam 43a and the lever 45 is oscillated, thus reciprocating the pump rod 47 and operating the pump. If any oil should run down the lever 45, it will not pass downward on the pump rod or through the pipe 12, but will be received and deflected by the cover 48. It will be seen that the casing 10 is closed and the gears and other parts can run in oil.

It will be noted that the gear mechanism can be readily removed from the end of shaft 14 by removing the cover 40 which carries the gear 40a. The propeller normally being disconnected from shaft 14, it will be seen that the generator can be run as a motor to drive said shaft and thus drive the pump mechanism. It will also be noted that when the propeller has attained the required speed to be connected to the shaft, that the propeller and generator will run at the same speed and the pump driving mechanism will simultaneously be driven.

In Figs. 7 and 8 a modified construction is shown in which the propeller blades 56 are secured to the hub 56a which is bored to accommodate the shaft 57 corresponding to shaft 14 in Figs. 1 to 6. Said shaft has a sleeve 58 thereon and roller bearings 59 are disposed between said sleeve and the cylindrical hub 60a of the member 60 having a circular flange at one side of the propellers 56 which is integral with sleeve 60a. Said flange also has formed integrally therewith hollow cylindrical studs 60b disposed in circumferentially spaced holes in the hub 56a of the propeller. Headed and nutted bolts 61 extend through member 60 and studs 60b and also through a pair of bars 62 respectively, which bars are disposed at either side of the shaft 57. Bars 62 have the weights 63 respectively secured at one end thereof and said bars are pivotally connected by a pair of links 64. The bars 62 are also connected by the tension springs 65. The bars 62 each have secured thereto by one of the bolts connecting the links 64 thereto, a shoe 66. The shaft 57 has secured thereto a frusto-conical clutch member 67 and a second reversely disposed similar clutch member 68 is provided, spaced a short distance from member 67 and held in position by circumferentially spaced headed and nutted bolts 69 having nuts threaded thereon at each side of the member 68 and having coil springs 70 surrounding the same between the member 67 and the heads thereof. The member 67 has a pair of arms 67a projecting from the rear side thereof to which are pivoted the bell crank members 71 having one of their arms provided with a curved face and engaging the heads of bolts 69. The other arms of the members 71 have adjustably secured thereon the weights or balls 72, said arms 71 being connected by the tension coil springs 73.

In operation of the device shown in Figs. 7 and 8, when the propeller 56 has attained a certain speed, the weights 63 will swing away from shaft 57 and the shoe 66 will be moved inwardly and engage the conical surface of the members 67 and 68. The members 66, 67 and 68 constitute a clutch and the propeller will then be connected to the shaft 57 by this clutch. When the propeller has attained a much greater speed, the balls 72 will be thrown outwardly by centrifugal force, which action will swing the short arms of member 71 longitudinally of the shaft 57, so that bolts 69 are moved parallel to said shaft. These bolts are rigidly connected to member 68 and said member will thus be pushed away from member 67 and springs 70 compressed. When member 68 moves away from member 67, the grip of the shoes 66 is released so that the clutch formed by members 66, 67 and 68 is thus released and the propeller is again free to rotate relatively to shaft 57. It will thus be seen that when the said propeller attains a certain speed, it will be disconnected from the said shaft.

It will be understood that when it is desired to render the device inoperative, the operator can pull upon the cable 54 and swing the vane 50a so that the same is substantially parallel with the plane of the propellers. The propellers will then be swung out of the wind by the vane and the same will not be operated.

From the above description it is seen that applicant has provided a very simple and efficient structure of wind operated power plant and means for controlling the same. The generator, propeller and transmission mechanism are effectively and conveniently carried in one bracket which is pivoted for the necessary swinging movement.

In the described structure the propeller can be used to drive the generator and also to drive the transmission mechanism by means of which a pump or other machine may be operated. The generator can also be uncoupled from the shaft which carries the propeller and the propeller will then merely drive the transmission mechanism and operate the pump or other device. The propeller is automatically connected and disconnected from the driving shaft at the desired speeds, so that the propeller will have sufficient work to run the generator and transmission mechanism before being coupled thereto, and will be disconnected so that undesirable speeds will not be obtained in a very high wind. The device is simply and compactly built and the same has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the novel parts and combinations of parts disclosed and defined in the appended claims.

What is claimed is:—

1. An air motor having in combination, a column having a bearing disposed about a vertical axis, a frame rotatably mounted on said bearing, a substantially horizontal shaft journaled in said frame, a propeller mounted at the end of said shaft, an electric generator disposed at an intermediate portion of said frame having a rotor connected to said shaft at an intermediate portion thereof, and a power transmission mechanism disposed at the other end of said shaft.

2. An air motor having in combination, a column having a bearing disposed about a vertical axis, a frame rotatably mounted on said bearing having a yoke portion open at one side with spaced bearings, a shaft journaled in said bearings, a generator carried in said yoke portion between said bearings, a propeller on said shaft at one end of said yoke outside of one of said bearings, and a transmission mechanism at the other end of said yoke outside of the other of said bearings.

3. An air motor having in combination, a column, a frame journaled thereon, a substantially horizontal shaft journaled in said frame, a propeller adjacent one end of said shaft, an internal gear secured to said frame, an eccentric secured to said shaft, a gear journaled on said eccentric and in mesh with said internal gear, a second internal gear journaled on said frame concentric with said shaft and first mentioned gear, said second mentioned gear also meshing with said second internal gear, said last mentioned internal gear having a smaller number of teeth than said first mentioned internal gear, whereby said second mentioned gear gyrates in mesh with said other gears, a cam carried by said second internal gear, an oscillating lever engaged by said cam and means connected to and moved by said lever adapted to be connected to a pump or other machine.

4. An air motor having in combination, a column, a frame journaled on said column about a substantially vertical axis, said frame member comprising a yoke portion open at one side having bearings adjacent the ends of its arms, a generator carried between said arms and having a stator connected to one of said arms, a shaft journaled in said bearings, a rotor for said generator secured to said shaft, a propeller at one end of said shaft and yoke normally disconnected from said shaft, and releasable means connecting said propeller to said shaft whereby said generator may be run as a motor to operate other equipment without running said propeller when said means is released.

5. An air motor having in combination, a column, a frame journaled on said column about a substantially vertical axis, said frame member comprising a yoke portion having bearings adjacent the ends of its arms, a shaft journaled in said bearings, a propeller revoluble about said shaft and adapted to be connected thereto, a casing adjacent the other end of said shaft, a pump driving gear mechanism carried on said latter end of said shaft, a cover for said casing forming a portion of said gear mechanism, said mechanism being removable from the end of said shaft after said cover is removed.

6. An air motor having in combination, a column, a frame journaled on said column about a substantially vertical axis, a substantially horizontal shaft journaled in said frame, said frame comprising a casing, a pump driving mechanism driven by said shaft, and disposed in said casing, an oscillating lever actuated by said mechanism, a pump rod reciprocable in said column, and a cover for said column surrounding said rod below said lever whereby oil cannot run from said lever down through said column.

7. An air motor having in combination, a rotatably mounted frame, having a yoke portion with spaced bearings, a shaft journaled in said bearings, a generator driven by said shaft and disposed between said bearings, one of said bearings having a flange thereon, a stator for said generator connected to said flange and a propeller disposed on said shaft at the outer side of said other bearing and adapted to be connected to said shaft for driving said generator.

8. An air motor having in combination, a frame mounted for rotation about a vertical axis comprising a bearing, a substantially horizontal shaft journaled in said bearing, a generator driven by said shaft and disposed at an intermediate portion thereof, said bearing having a flange, a stator for said generator connected to said flange, and a propeller disposed adjacent one end of said shaft and adapted to be connected thereto for driving said generator.

9. An air motor having in combination, a rotatably mounted frame including a yoke portion with spaced bearings, a shaft journaled in said bearings, a generator driven by said shaft and disposed between said bearings, one of said bearings having a flange, said generator including a stator connected to said flange, a propeller disposed on said shaft at the outer side of said other bearing, means for connecting said propeller and shaft, a casing carried on said shaft at the outer side of said first mentioned bearing and transmission mechanism disposed in said casing.

10. An air motor having in combination, a frame, a substantially horizontal shaft journaled therein, a propeller having a hub with a central bearing mounted for free rotation on said shaft, a clutch member secured to said shaft, a member secured to one side of said hub having circumferentially spaced tubular members extending transversely through said hub and a pin disposed in one of said tubular members and having a portion projecting into said clutch member to form a clutch operating means.

11. An air motor having in combination, a frame comprising a separable hub, a member carried in said hub adapted to be revolubly mounted about a substantially vertical axis in the top of a support, said frame also comprising a radially extending yoke having spaced arms with aligned bearings in the ends thereof, a shaft journaled in said bearings, a generator having a rotor carried by said shaft between said arms, a pump driving mechanism secured at one end of said shaft outside of one of said arms, a propeller journaled on said shaft adjacent the other end thereof outside of the other arm, and a clutch mechanism for connecting said propeller to said shaft at the end of said shaft beyond said propeller.

12. An air motor having in combination, a rotatably mounted frame including a radially extending yoke portion having arms with bearings in the ends thereof, a shaft journaled in said bearings, one of said bearings having a flange formed thereon, a generator disposed between said arms having a stator secured to said flange, a propeller journaled on said shaft at the outer side of one of said arms and means at the outer side of said propeller for connecting said propeller and shaft.

13. An air motor having in combination, a rotatably mounted frame including a radially extending support, a substantially horizontal shaft journaled in said support, a propeller journaled on one of the ends of said shaft, a generator carried by said support and having a rotor connected for driving with said shaft, a power take off mechanism carried by said support and connected for driving with said shaft, means for connecting said propeller and shaft and releasable means securing said rotor of said generator to said shaft.

14. An air motor having in combination, an upright supporting structure, a support rotatably mounted at the top thereof, a substantially horizontal shaft journaled in said support, a propeller at one end of said shaft, a generator mounted on said support and directly driven from said shaft and means associated with said shaft and said propeller for connecting said propeller with said shaft after said propeller has attained a predetermined speed.

GEORGE MANIKOWSKE.